May 19, 1970 L. J. ZEZZA 3,512,565

SELF-RETAINING NUT STRUCTURE

Filed June 28, 1968 2 Sheets-Sheet 1

INVENTOR
LOUIS J. ZEZZA

BY
Pennie, Edmonds, Morton, Taylor & Adams
ATTORNEYS

May 19, 1970  L. J. ZEZZA  3,512,565
SELF-RETAINING NUT STRUCTURE
Filed June 28, 1968  2 Sheets-Sheet 2

INVENTOR
LOUIS J. ZEZZA

BY
Pennie, Edmonds, Morton, Taylor & Adams
ATTORNEYS

United States Patent Office 3,512,565
Patented May 19, 1970

3,512,565
SELF-RETAINING NUT STRUCTURE
Louis J. Zezza, Spring Valley, N.Y., assignor to United Nuclear Corporation, Elmsford, N.Y., a corporation of New York
Filed June 28, 1968, Ser. No. 741,094
Int. Cl. F16b 39/32
U.S. Cl. 151—28    2 Claims

ABSTRACT OF THE DISCLOSURE

A nut having a closely coiled helical spring of the same internal diameter as the nut and axially secured thereto at one end so as to engage the threads of the bolt. The opposite end of the coil has a diametrical tang forming a locking element, and the bolt or other member on which the nut is threaded has a crosswise slot at its end for receiving the tang.

DESCRIPTION OF THE PRIOR ART

As disclosed in Mendenhall Pat. No. 1,301,958 a heavy coil spring has a tang which engages a cross slot on the end of the bolt, and the opposite end of the spring is bent downwardly and enters a slot in the nut. The spring is placed under tension in a direction to tighten the nut on the bolt for the purpose of preventing the nut from unscrewing. The spring is larger than the bolt and is placed loosely around the bolt. It has no engagement with the bolt threads.

Moore PAT. No. 979,538 shows a staple-shaped key one leg of which engages a cross slot in the end of a bolt and the opposite end of which has a hook adapted to be sprung over the edge of the nut and thus prevent its accidental turning in the direction to loosen the nut.

SUMMARY OF THE INVENTION

The purpose of the present invention is not unlike that of the prior patents, namely to provide a construction by which a nut is locked upon a bolt, spindle or other externally threaded member so that the loosening of the nut will be prevented, and still provide for the removal of the nut whenever it becomes necessary, without mutilating, injuring or impairing the efficiency of the device for subsequent use.

In accordance with the invention a helical coil of stiff resilient wire, advantageously having the shape of a rhomboid in cross section, is welded or otherwise permanently secured at one end to the nut in such a way that the internal threads of the coil are continuous with those of the nut. The outer end of the helical coil is provided with a crosswise tang which extends diametrically. The bolt on which the nut is to be placed is provided at its end with at least one diametrically placed crosswise slot.

In applying the nut to the bolt, for example, for the purpose of securing together two members of an article or apparatus, the nut is screwed onto the bolt and turned until it is in contact with the outer surface of one of the members. The length of the bolt and the extent of the wire coil are so chosen that at this point the tang is approximately in contact with the outer end of the bolt. Then the bolt is set up, and in doing so the tang or locking element will first be restrained by contact with the end of the bolt, and then will spring inwardly into the cross slot. The stiffness of the wire coil is sufficient to prevent the loosening of the nut on the bolt even though the tendency to loosen the nut is to turn he coil in a direction to unwind the coil rather than to tighten it.

Figure 1:
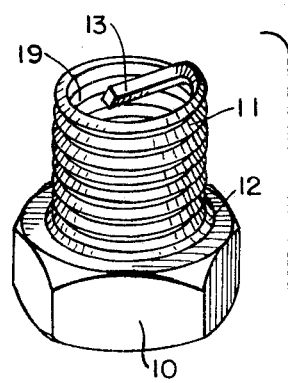
FIG. 1 is a perspective or isometric view of the two parts of the self-retaining nut structure, separated from each other.
Figure 2:
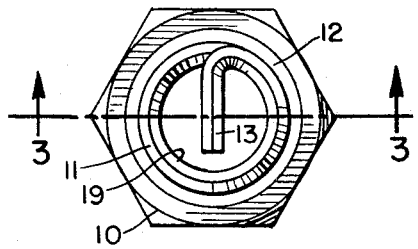
FIG. 2 is a top view of the self-retaining nut as shown in FIG. 1.
Figure 3:
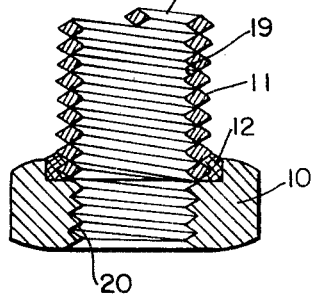
FIG. 3 is a longitudinal central section of the self-retaining nut taken on line 3—3 of FIG. 2.

Referring first to FIGS. 1-3, the self-retaining nut structure comprises a standard nut 10 having a closely wound helical coil spring 11 mounted thereon for example as by welding at 12 within a counterbore in the nut as shown in FIG. 3. At the upper end of coil 11 there is a tang 13 which forms the locking element and is made by bending the end portion of coil 11 into diametrical position with respect to the coil.

The bolt member of the structure is shown at 14 and is of standard construction having conventional threads 15 and a hexagonal head 16. Several of the threads 15 are omitted or removed so as to leave a bare cylindrical surface 14a next to the free upper or outer end of bolt 14. A cross slot 17 is formed in this free end of the bolt. Advantageously the bolt end is beveled as indicated at 18. Slot 17 is adapted to receive the locking tang 13 and therefore the depth of the slot is approximately the thickness of the tang and may be somewhat greater than the thickness of the tang in order to provide leeway in turning the nut 10 to locked position as will be referred to later on.

Figure 4:
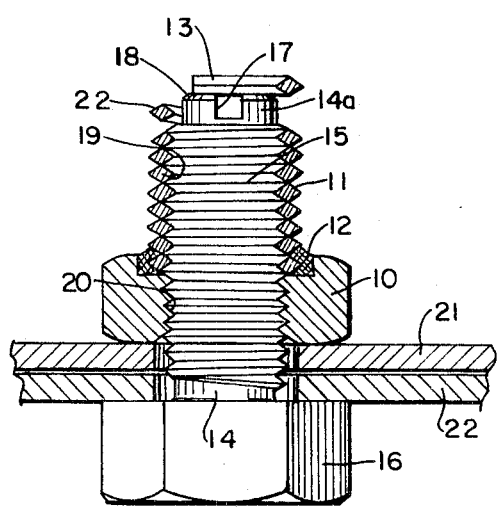
FIG. 4 is a sectional view showing the bolt of FIG. 1 applied to secure two plates together and with the nut approaching but not yet in the locked position.
Figure 5:
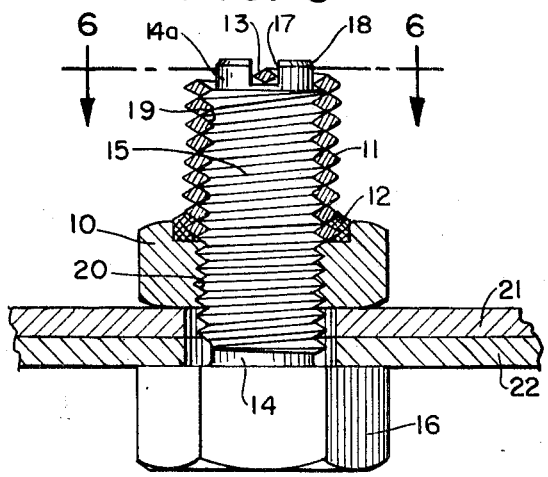
FIG. 5 is a view similar to FIG. 4 showing the parts locked together.
Figure 6:
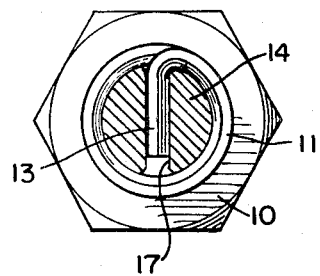
FIG. 6 is a transverse section taken on line 6—6 of FIG. 5.

Although the helical coil 11 may be made of spring wire which is round in cross section, it advantageously has a cross section which has the shape of a rhomboid as shown in FIGS. 3, 4 and 5. The closely wound helical coil 11 forms internal threads 19 which correspond with the internal threads 20 of nut 10 and which also fit the external threads 15 of bolt 14 when the parts are assembled. Coil 11 extends to the vicinity of the bottom of slot 17 as indicated in FIGS. 4 and 5.

In FIG. 4 two plate members 21 and 22 are shown as being held one against the other by the assembled self-retaining nut structure of the invention. Nut 10 and its associated helical coil 11 have been screwed onto the threads 15 of the bolt and the lower surface of nut 10 is in contact with the upper plate 21. As shown in FIG. 4 the tang 13 of the helical coil 11 has reached and engaged the upper surface of the bolt end and forced the first turn 22 away from the remainder of coil 11. Thus the presence of the bare end surface 14a on bolt 14 i.e. the omission of one or more turns of the external threads 15 enables the locking element, tang 13, to shift from its normal position outwardly and rotate as nut 10 is turned. The continued turning of nut 10 to set up the bolt will cause tang 13 to spring into slot 17 as shown in FIG. 5.

This provides some leeway in tightening the nut on the bolt and placing the tang 13 in slot 17 at the end of the tightening operation. It may be that tang 13 will at first only parially enter slot 17 and be held by the coil spring 11 with the center of the tang somewhat above the end of bolt 14. Should it be desired to tighten nut 10 further the continued rotation of the nut will cause the lower surface of tang 13 to engage an outer edge of slot 17, and the result will be that tang 13 is cammed outwardly and is again on the end surface of bolt 14. A further turning of the bolt through an angle of 180° will allow tang 13 to again enter slot 17 in locking position as shown in FIG. 5.

As a further means of providing leeway in tightening the nut 10 an additional slot similar to slot 17, but not shown, may be formed in the end of bolt 14 at right angles to slot 17. In this way the nut need be turned only through an angle of 90° in order to reengage tang 13 with one or the other of these two slots.

If it should be desired to remove the self-retaining nut from bolt 14 this may be done by springing or lifting tang 13 out of slot 17 by taking advantage of the resiliency of the upper turns of the helical coil spring 11, and then applying a wrench to nut 10. To facilitate such removal two concentric tools 23 and 24 (FIG. 7) may be provided, only the lower ends of these tools being shown. The inner tool 23 has a recess having internal threads 25 at its inner or lower end, the thread configuration corresponding with that of the external threads 15 on bolt 14 and also with the external threads of the helical coil spring 11.

Figure 7:
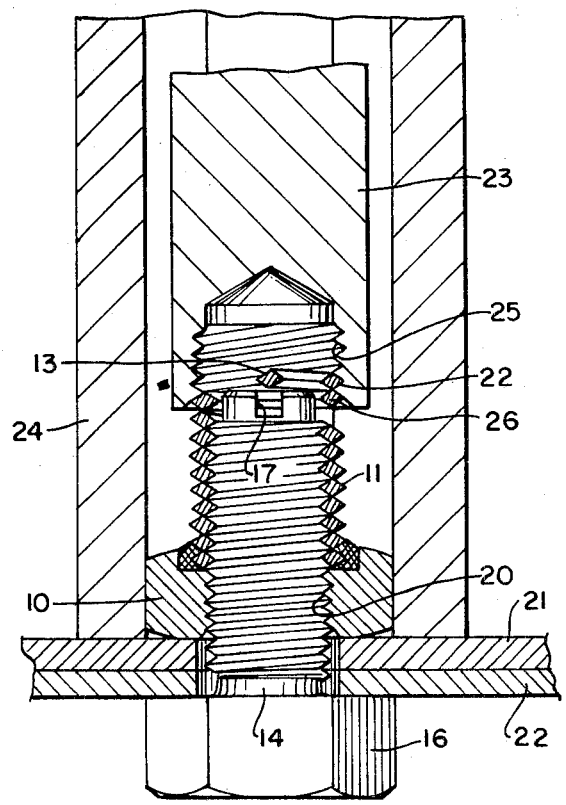
FIG. 7 is a central sectional view illustrating the use of a tool for separating the self-retaining nut from the bolt.

Consequently by inserting tool 23 and turning it in the clockwise didection one or two rotations the lower portion of threads 25 will engage the first one or two or possibly more turns of the helical coil spring 11. In FIG. 7 the uppermost turn 22 and the adjacent turn 26 are indicated to have been engaged by threads 25. After this is accomplished the outward pulling of tool 23 will spring the turns 22 and 26 away from the remainder of coil 11 and free tang 13 from slot 17. Thereupon a wrench may be applied to nut 10 to remove it from bolt 14. The outer tool 24 is in the form of a socket wrench for this purpose.

It will be understood that the inner and outer tools 23 and 24 can also be used in assembling the nut on the bolt. Inner tool 23 can be used as described above to keep tang 13 from springing into slot 17 while outer tool 24 is operated to tighten the nut further. The use of the tools in this way is advantageous where it may be desired to deepen slot 17 in order to provide a considerable leeway in tightening the nut on the bolt and having tang 13 in slot 17 at the end of such tightening operation.

I claim:

1. A self-retaining nut structure comprising the combination of an externally threaded member having at its free end a portion bare of threads, said bare end portion having at least one crosswise slot and the end faces on opposite sides of the slot being co-planar, and a self-retaining nut having internal threads fitting the threads of said externally threaded member and screwed onto said member, said nut having a helical coil spring associated therewith whose internal thread configuration is similar to that of the nut and engages the threads of the externally threaded member exteriorly of the nut, a diametrical tang supported by the outermost turn of the coil spring, said bare end portion permitting the tang to be forced in the axial direction by one of the co-planar end faces of the externally threaded member as the nut is tightened said tang engaging said slot when the nut is in its final tightened position, and said coil spring being secured at its inner end to said nut with at least one turn at its outer end lying over said bare end portion of the externally threaded member so that at least one turn of said coil spring can be engaged and forced in an axial direction to release the tang from said slot.

2. A self-retaining nut structure as set forth in claim 1 wherein the inner end of the helical coil spring is welded to the surface of the nut.

References Cited

UNITED STATES PATENTS

| 1,017,845 | 2/1912 | Brown | 151—30 |
| 1,143,247 | 6/1915 | Bates | 151—29 |
| 2,745,457 | 5/1956 | Lang. | |

FOREIGN PATENTS

| 166,068 | 7/1921 | Great Britain. |
| 55,420 | 1/1952 | France. |

MARION PARSONS, JR., Primary Examiner

U.S. Cl. X.R.

85—32; 151—6, 14